July 8, 1941.  G. S. REEVES  2,248,251

AUTOMOBILE STEERING APPARATUS

Filed April 14, 1939   2 Sheets-Sheet 1

INVENTOR.
Glenn S. Reeves
BY A. B. Bowman
ATTORNEY.

July 8, 1941.    G. S. REEVES    2,248,251
AUTOMOBILE STEERING APPARATUS
Filed April 14, 1939    2 Sheets-Sheet 2

INVENTOR.
Glenn S. Reeves
BY
A. B. Bowman
ATTORNEY.

Patented July 8, 1941

2,248,251

UNITED STATES PATENT OFFICE 2,248,251

AUTOMOBILE STEERING APPARATUS

Glenn S. Reeves, San Diego, Calif.

Application April 14, 1939, Serial No. 267,863

6 Claims. (Cl. 180—79.1)

My invention relates to a steering apparatus for automobiles in which the steering is accomplished by motors controlled by a rheostat and the objects of my invention are:

First, to provide an automobile steering apparatus which is applicable for use in connection with all wheeled vehicles, such as automobiles, trucks, buses or like vehicle;

Second, to provide an automobile steering apparatus of this class by the use of which the automobile is guided, steered and controlled by a motor or motors which are electrically controlled;

Third, to provide an automobile steering apparatus of this class which is so constructed and arranged that a tire blowout or broken axle will not greatly affect the steering of the vehicle;

Fourth, to provide an apparatus of this class which may be applied to the conventional steering of automobiles with but slight changes and additions;

Fifth, to provide an apparatus of this class which will facilitate the parking of automobiles or like vehicles in close places;

Sixth, to provide an apparatus of this class which will reduce to a minimum the manual effort required in steering automobiles or other like vehicles;

Seventh, to provide a novel apparatus for steering automobiles or other vehicles;

Eighth, to provide an apparatus of this class which provides greater safety in the driving and steering of automobiles or like vehicles; and Ninth, to provide an apparatus of this class which is very simple and economical of construction, easy to operate, efficient in its action and which will not readily deteriorate or get out of order.

Figure 1:
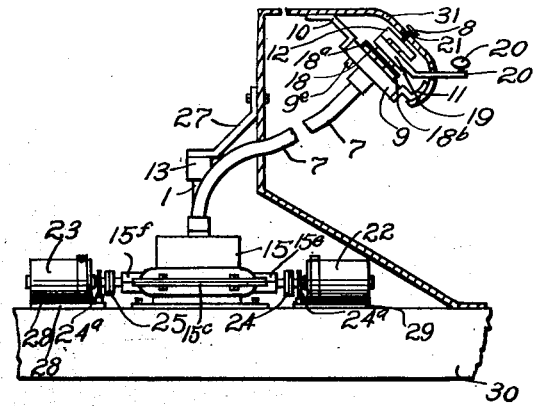
Figure 2:
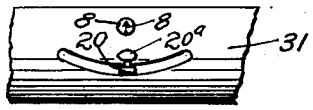
Figure 3:
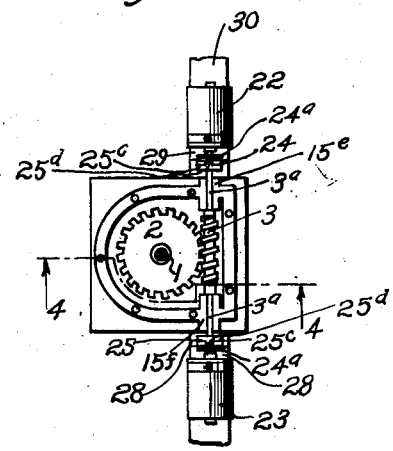
Figure 4:
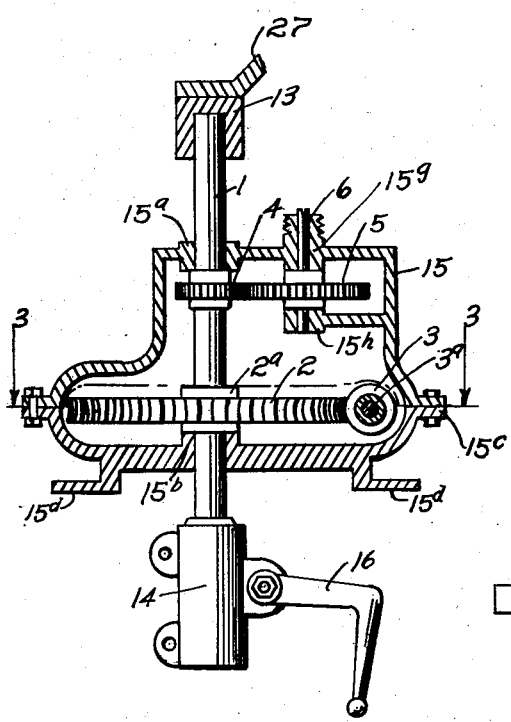
Figure 6:
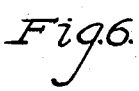
Figure 5:
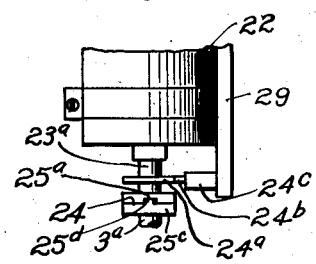
Figure 7:
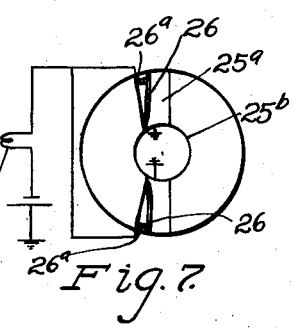
Figures 8, 9:
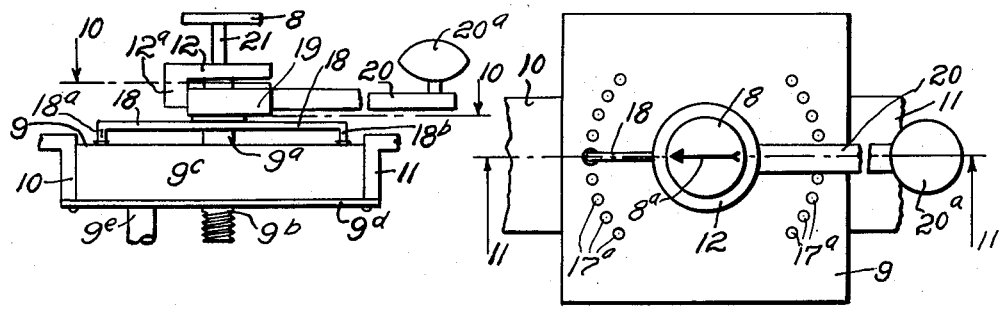
Figures 10, 11:
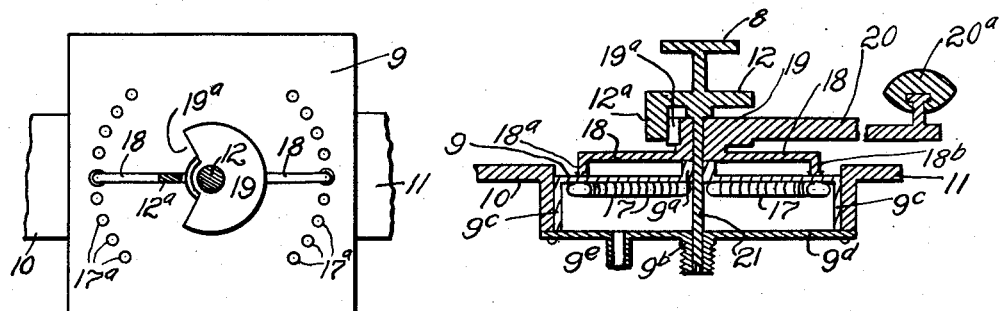
Figure 12:
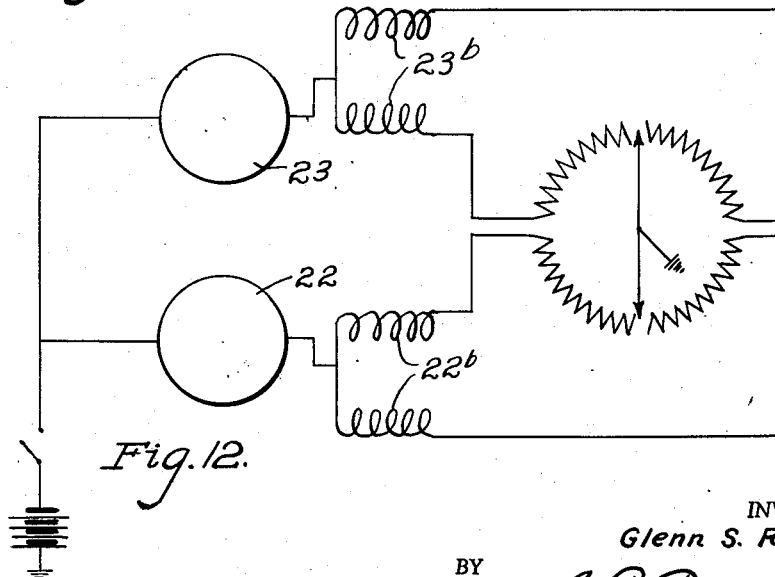

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon which form a part of this application in which:

Figure 1 is a diagrammatic fragmentary side elevational view of my automobile steering apparatus shown in connection with the dash and frame of an automobile; Fig. 2 is a fragmentary front elevational view of the dash of the automobile showing the operating parts extending through the dash; Fig. 3 is a sectional view of the gear case taken from the line 3—3 of Fig. 4 on a reduced scale showing some of the parts and portions in elevation to facilitate the illustration; Fig. 4 is a sectional view on an enlarged scale taken from the line 4—4 of Fig. 3 showing some of the parts and portions in elevation to facilitate the illustration; Fig. 5 is an enlarged detailed fragmentary view of one of the motors, motor shaft and coupling mechanism on an enlarged scale; Fig. 6 is an enlarged detailed view of one of the coupling members shown fragmentarily; Fig. 7 is an enlarged sectional view of a coupling member showing the switch and wiring arrangement in connection therewith; Fig. 8 is an enlarged side elevational view of the rheostat control mechanism shown fragmentarily; Fig. 9 is a top or plan view thereof showing portions fragmentarily; Fig. 10 is a sectional view taken from the line 10—10 of Fig. 8; Fig. 11 is a sectional view taken from the line 11—11 of Fig. 9; and Fig. 12 is a diagrammatic view of the wiring used in connection with my automobile steering apparatus.

Similar characters of reference refer to similar parts and portions throughout the several views of the drawings:

The steering column shaft 1, steering gear wheel 2, worm gear 3, travel limiting gear 4, travel limiting gear 5, shaft 6, flexible shaft 7, turned position indicator 8, rheostat casing member 9, rheostat casing member supports 10 and 11, travel limiting member 12, upper end bearing for steering column shaft 13, steering gear 14, gear case 15, pitman arm 16, rheostat 17, contact arm 18, limiting sector member 19, steering arm 20, rheostat shaft 21, motors 22 and 23, motor couplings 24 and 25, spring contacts 26, upper end bearing bracket 27, motor supports 28 and 29, chassis channel 30 and extended dash 31 constitute the principal parts and portions of my automobile steering apparatus.

The steering column shaft 1 is a relatively short shaft and is preferably positioned substantially vertically as shown best in Figs. 1 and 4 of the drawings. It is journaled in journal portions 15a and 15b in the gear case 15 which is preferably divided at 15c and provided with flanges connected by bolts in conventional manner. This casing 15 is supported on the chassis frame 30 by means of legs 15d shown best in Figs. 1 and 4 of the drawings.

Connected with the lower end of the shaft 1 is a conventional steering gear 14 which is no part of my present invention, and connected therewith is a pitman arm 16 which connects with the conventional drag link, not shown. This pitman arm may be conventional, but it is preferred to use an L shaped arm member as shown in Fig. 4 of the drawings.

Mounted on the journal portion 15b of the case 15 and secured on the shaft 1 by means of the hub 2a is the steering gear wheel 2 which is a worm gear wheel and meshing with this worm gear wheel 2 is a worm gear or pinion 3 which is mounted on a shaft 3a, which is mounted in journals 15e and 15f in the side wall of the casing 15 shown best in Fig. 3. Connecting with the opposite ends of this shaft 3a are the coupling members 24 and 25. Each of the coupling members 24 and 25 consists of two members, one secured to the motor shaft 23a and the other secured to the shaft 3a. The one secured to the shaft 23a is provided with a slot 25a, the walls of which diverge outwardly from a hub portion 25b, while the portions 25c, secured to the shaft 3a is provided with a pair of lugs 25d which are straight, which leaves an outwardly diverging slot at opposite sides in which are mounted spring contact members 26 which are adapted to engage with contacts 26a when the motors are pulling so that there is coupling engagement, but if either of the motors stop, then the contacts are open which turns off a light 26b mounted on the dash or other place in sight of the operator of the automobile so that he can readily determine if either of the motors are stopped and not in operation, it being noted that adjacent each coupling 24 and 25 is a slip ring 24a which engages a contact brush 24b mounted on an insulated support 24c mounted on the motor supports 28 and 29.

Mounted on the shaft 1 adjacent the journal portion 15a of the case 15 is travel limiting gear 4 which meshes with another travel limiting gear 5 which is mounted on a shaft 6 which is journaled in journal portions 15g and 15h of the casing 15, shown best in Fig. 4. Connected with the upper end of the shaft 6 is a flexible shaft 7 which extends upwardly and backwardly toward the dash of the automobile. It connects at its opposite end with the rheostat shaft 21, shown best in Fig. 11 of the drawings.

The upper end of the shaft 1 is journaled in the upper end bearing for the steering column shaft 13, which bearing is supported by means of the upper end bearing bracket 27, shown best in Figs. 1 and 4 of the drawing. This bracket 27 is secured in position on the front surface of the dash 31 as shown in Fig. 1. This rheostat shaft 21 is journaled in bearings 9a and 9b in the rheostat casing member 9, as shown in Fig. 11. This casing 9 is hollow and is provided with sides 9c and with a separate member 9d. This casing 9 is supported by means of supports 10 and 11 which may be variously shaped to fit the under side of the front portion of the extended dash 31 as shown best in Fig. 1 of the drawings. Mounted in the casing 9 is the rheostat 17 which is electrically connected to the motors 22 and 23 as shown in the wiring diagram in Fig. 12, the wires passing through a conduit 9e extending from the casing 9. The rheostat is provided with a plurality of contacts 17a which are adapted to be engaged by the contact arm 18 which is provided with opposed arms, and downwardly extending therefrom are contact point members 18a and 18b. Integrally connected with these contact arms 18 is the limiting sector member 19, shown best in Figs. 10 and 11 of the drawings which is circular in form and provided with a cutaway portion 19a. The members 18 and 19 are revolubly mounted on the shaft 21. Secured to the limiting sector member 19, preferably integral therewith, is the steering arm 20 which extends some distance and is provided on its extended end with a handle member 20a, shown best in Figs. 8 and 9 of the drawings.

Secured to the shaft 21 above the member 19 is the travel limiting member 12 which is provided with a downwardly extending portion 12a which is adapted to be engaged by the straight sector portions of the limiting sector member 19, as shown best in Fig. 10 for limiting the travel of the steering column shaft 1.

Secured above the travel limiting member 12 in alignment with the shaft 21 is the turn position indicator 8, which is provided with an arrow 8a on its upper surface and is adapted to indicate the position of the front wheels of the automobile, whether they are turned to the right or the left and substantially the distance they are turned and which shows through the dash of the automobile as shown in Figs. 1 and 2 of the drawings.

The operation of my automobile steering apparatus is substantially as follows: When the automobile is to be driven straight ahead or backwardly and the wheels are straight, the steering arm 20 is normally straight back as shown in Fig. 2 of the drawings and the indicating arrow shows straight ahead in which case the steering column shaft 1 remains idle and inoperative. In order to turn to the right or left, the steering arm 20 is turned so that the contact member 18 engages the contact to the right or left, whichever direction it is desired to turn, and the motors 22 and 23 will turn the steering column shaft 1 and through the steering gear 14 and pitman arm 16 will turn the wheels to the right or left dependent upon the turning of the steering arm 20. The first contact position will cause the motors to run slowly. If they are moved to the second contact position they will run faster. Thus, if the automobile is to be turned from its course, the steering arm is moved in the appropriate direction and when sufficient turn has been made the steering arm is brought back to a straight position as shown in Fig. 2. If it is desired to return the wheels to straight position, the steering arm 20 is moved to the opposite side which reverses the motors and straightens the wheels. It will be noted that the motors are double wound with field windings 22b and 23b shown in Fig. 12, so that they may be turned in reverse direction. It will also be noted that there being two motors, if one of the motors fails for any reason, the other will operate the steering column shaft and therefore steer the automobile. It is therefore clear that one motor may be used, but two provide for a safer operation. In order to stop the steering motors 22 and 23, before the front wheels of the automobile have reached the limit of their turn, the motor current must be shut off by bringing the steering arm of the rheostat back to the straight or neutral position. In order to accomplish this there is provided the travel limiting gears 4 and 5 and the shafts 6, 7 and 21 and the travel limiting member 12, it being noted that the shaft 21 revolves in the reverse direction to the steering column shaft 1 and inasmuch as the member 12 is connected with the shaft 21 the arm 12a will engage one of the sides of the open portion of the limiting sector member 19 and the steering arm 20 being secured thereto the revolution of the shaft 21 will bring the segment and steering arm back to neutral position which will shut off the motors.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In an automobile steering apparatus of the class described, the combination with the steering mechanism of an automobile including a pitman arm, of a steering column shaft operably connected with said pitman arm, a worm gear secured to said shaft, a worm pinion meshing therewith, a motor operably connected with said worm pinion, a rheostat for controlling the operation of said motor, and a light circuit in cooperation with said motor including a switch means on the shaft of said motor.

2. In an automobile steering apparatus of the class described, the combination with the steering mechanism of an automobile, of a steering column shaft operably connected therewith, a worm gear secured to said shaft, a worm pinion meshing therewith, a motor operably connected with said worm pinion, means for limiting the travel of said steering column shaft in one direction, said means including a rheostat arm and a sector on said rheostat arm and a traveling limiting member operably engageable with said sector and operative in the reverse direction to said steering column shaft.

3. In an automobile steering apparatus of the class described, the combination with the conventional automobile steering gear, of a steering column shaft, a gear casing in which said steering column shaft is journaled, means for securing said casing to the automobile chassis frame, a worm gear on said shaft, a worm pinion meshing therewith, a shaft for said worm pinion journaled in said casing, reversable motors operatively connected with the opposite ends of said shaft, and coupling means in connection with said shaft for each motor, an electric switch and light means electrically connected with said coupling means.

4. In an automobile steering apparatus of the class described, the combination with the conventional automobile steering gear, of a steering column shaft, a gear casing in which said steering column shaft is journaled, means for securing said casing to the automobile chassis frame, a worm gear on said shaft, a worm pinion meshing therewith, a shaft for said worm pinion journaled in said casing, reversable motors operatively connected with the opposite ends of said shaft, coupling means in connection with said shaft for each motor, an electric switch and light means electrically connected with said coupling means, a travel limiting gear secured on said steering column shaft in said casing, another travel limiting gear meshing therewith, and a series of shafts in connection with said second mentioned gear.

5. In an automobile steering apparatus of the class described, the combination with the conventional automobile steering gear, of a steering column shaft, a gear casing in which said steering column shaft is journaled, means for securing said casing to the automobile chassis frame, a worm gear on said shaft, a worm pinion meshing therewith, a shaft for said worm pinion journaled in said casing, reversable motors operatively connected with the opposite ends of said shaft, coupling means in connection with said shaft for each motor, an electric switch and light means electrically connected with said coupling means, a travel limiting gear secured on said steering column shaft in said casing, another travel limiting gear meshing therewith, a series of shafts in connection with said second mentioned gear, a rheostat in connection with one of said shafts, a steering arm revoluble on one of said shafts and in contact relation with said rheostat, a limiting sector member in connection with the rheostat operating arm, and a travel limiting member rigidly connected with one of said shafts in cooperative relation with said limiting sector member for reversing the operative relation of said rheostat arm.

6. In an automobile steering apparatus of the class described, the combination with the the conventional automobile steering gear, of a steering column shaft, a gear casing in which said steering column shaft is journaled, means for securing said casing to the automobile chassis frame, a worm gear on said shaft, a worm pinion meshing therewith, a shaft for said worm pinion journaled in said casing, reversable motors operatively conected with the opposite ends of said shaft, coupling means in connection with said shaft for each motor, an electric switch and light means electrically connected with said coupling means, a travel limiting gear secured on said steering column shaft in said casing, another travel limiting gear meshing therewith, a series of shafts in connection with said second mentioned gear, a rheostat in connection with one of said shafts, a steering arm revoluble on one of said shafts and in contact relation with said rhostat, a limiting sector member in connection with the rheostat operating arm, a travel limiting member rigidly connected with one of said shafts in cooperative relation with said limiting sector member for reversing the operative relation of said rheostat arm, and means for indicating the position of said steering column shaft in operative relation with said travel limiting gears and said travel limiting member.

GLENN S. REEVES.